June 12, 1956 F. M. ARBUCKLE 2,750,498

SYNCHRONIZATION OF TELEVISION DEFLECTION SYSTEMS

Filed July 5, 1952 2 Sheets-Sheet 1

INVENTOR.

FREDERICK M. ARBUCKLE

BY W. H. Sprague

ATTORNEY

INVENTOR.
FREDERICK M. ARBUCKLE
BY [signature]
ATTORNEY

United States Patent Office 2,750,498

Patented June 12, 1956

2,750,498

SYNCHRONIZATION OF TELEVISION DEFLECTION SYSTEMS

Frederick M. Arbuckle, Merchantville, N. J., assignor to Radio Corporation of America, a corporation of Delaware Application July 5, 1952, Serial No. 297,252

16 Claims. (Cl. 250—27)

This invention relates to the synchronization of electron beam deflection apparatus and particularly to apparatus for providing substantial noise immunity for the synchronization of television deflection systems.

Inasmuch as it is conventional to synchronize electron beam deflection systems, such as those used in television receivers, by pulses having an amplitude greater than the video signals representative of picture black, many of the synchronizing systems presently employed are susceptible of false control by noise pulses having amplitudes substantially greater than the black-representative video signals. One type of system which has been employed for the purpose of rendering television receiver deflection synchronization somewhat immune to the effects of noise pulses utilizes automatic frequency control apparatus embodying circuits having relatively long time constants. While such systems operate to effect a degree of noise immunity, they are subject to the disadvantage that the recovery time from any loss of synchronization is relatively great because of the effect of the long time constant circuits.

It, therefore, is an object of this invention to provide an improved synchronizing system for electron beam deflection apparatus which is both relatively immune to random noise pulses and also has a comparatively short synchronizing period.

Another object of the invention is to provide an improved, substantially noise-immune synchronizing system for the deflection apparatus of a television receiver which is effective to control the synchronization of either or both the horizontal and vertical sweep control oscillators.

Still another object of the invention is to provide a novel synchronizing system for a television receiver by which the synchronization of the horizontal sweep control oscillator may be effected with a high degree of noise immunity and with a relatively fast synchronization time and embodying a comparatively small number of relatively inexpensive additional components.

A further object of the invention is to provide a novel snychronizing system for the beam deflection apparatus of a television receiver which renders a high degree of noise immunity and which operates effectively in a positive manner, whereby to minimize the number and duration of the asynchronous operating periods of the deflection apparatus.

A still further object of the invention is to provide in a synchronizing system for electron beam deflection apparatus, a means for rendering automatic frequency control circuits substantially immune from false operation by noise pulses.

Another object of the invention is to provide, in a synchronizing system for electron beam deflection apparatus, a synchronizing signal amplifier which is gated so as to render the oscillator synchronizing system substantially immune from false operation by noise pulses.

In accordance with the present invention, the synchronizing signals are impressed upon the frequency control circuits of a sweep control oscillator only during fractions of the complete operating cycles of the deflection apparatus during synchronous periods of operation. During asynchronous periods, the frequency control circuits of the oscillator are rendered continuously susceptible to influence by the synchronizing signals.

These results are produced by means of gating apparatus, to the input of which the synchronizing signals are applied and to the output of which is coupled the frequency control circuit of the sweep oscillator. The gating apparatus is controlled normally during synchronous periods by pulses derived substantially in synchronism with the operation of the deflection apparatus so as to allow transfer of the synchronizing signals to the frequency control circuit. By this means, any noise signals which may be received between the times of reception of the synchronizing signals are not transferred to the frequency control circuits and, therefore, do not produce false synchronization.

The gating apparatus also is subject to a control during asynchronous periods whereby it is held open continuously for signals in the amplitude range of the synchronizing signals under the control of apparatus for varying the conducting threshold thereof. The threshold control apparatus, in turn, is responsive to a means for effectively detecting coincidence of the synchronizing signals and indicating pulses derived synchronously with the operation of the deflection apparatus. A lack of coincidence is effective to operate the threshold control apparatus in a manner to maintain the gating apparatus open at all times. It also is employed to render ineffective the control pulses utilized to periodically open the gating apparatus during normal operation. The coincidence detection apparatus also functions in response to coincidence of the synchronizing signals and the indicating pulses derived synchronously with the deflection apparatus to alter the threshold of the gating apparatus so that it is normally closed. In addition, the coincidence apparatus, in response to a state of coincidence, functions to render effective the operation of the gating apparatus by the control pulses produced synchronously with the deflection apparatus.

The novel features that are considered characteristic of this invention are set forth with particularity in the appended claims. The invention itself, however, both as to its organization and method of operation, as well as additional objects and advantages thereof, will best be understood from the following description when read in conjunction with the accompanying drawings.

Figure 1:
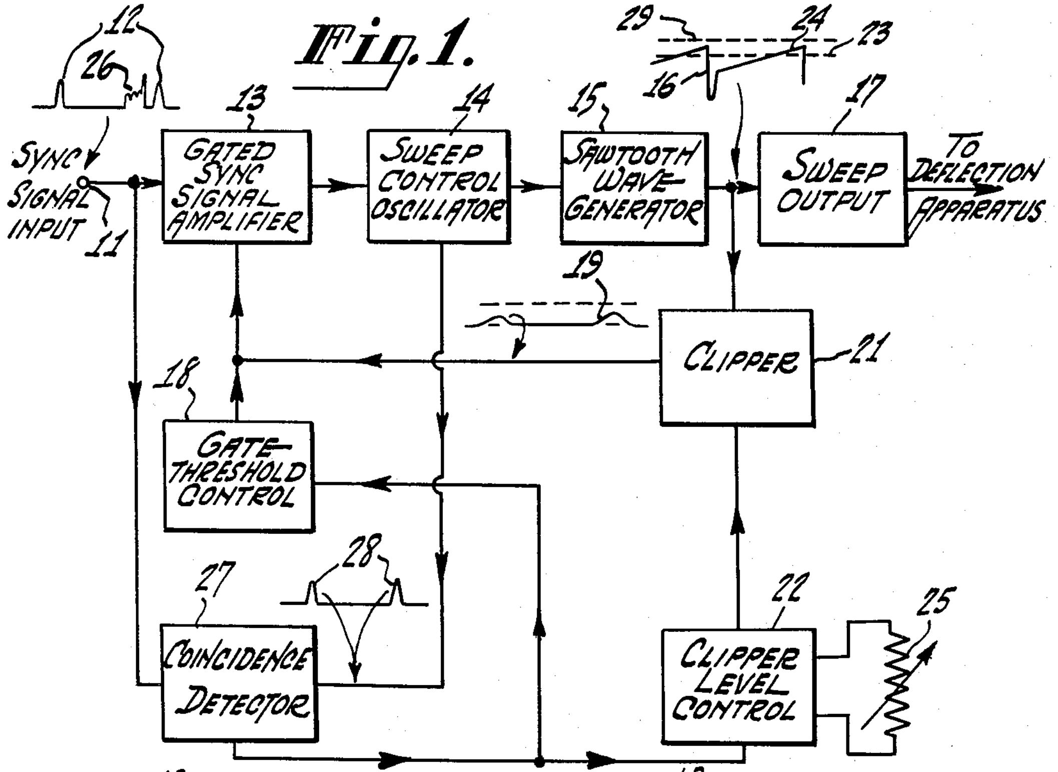
Figure 1 is a block diagram of an illustrative embodiment of the invention as used with a representative form of electron beam deflection system.

Reference first will be made to Figure 1 of the drawings for a description of the general arrangement of typical apparatus embodying the invention, together with an outline of its general mode of operation. A synchronizing signal input terminal 11 will be understood to constitute, for the purpose of the following description, a source of synchronizing signal pulses 12. It will be understood that, even though for the purpose of the present description the sync signals 12 are shown and described as separated from the video signal component of a composite television signal, such a composite television signal also may be developed at the input terminal 11 without affecting the operation of the apparatus embodying this invention in any substantial manner. The reason that the composite television signal may be used alternatively with the separated sync signals 12 will become apparent from a further description of the apparatus, particularly with regard to its mode of operation according to this invention.

The sync signals 12 are impressed by means of a gated sync signal amplifier 13 upon the frequency control circuit of a sweep control oscillator 14. The oscillator may be conventional and its output circuit is coupled to the input of a sawtooth wave generator 15 in a manner conventional in television deflection wave-generating apparatus. Accordingly, there is developed at the output circuit of the generator 15 a substantially sawtooth wave 16 which is impressed upon a sweep output stage 17 in a conventional manner, whereby to energize the electron beam deflection apparatus.

The operating threshold of the gated sync amplifier 13 is subjected to two types of control. The first of these controls is derived from gate threshold control apparatus 18. The second gated sync amplifier control is effected by gate control signal pulses such as 19 which are derived from a clipper stage 21. The input circuit of the clipper is coupled to the output circuit of the sawtooth wave generator 15 so that the sawtooth wave 16 is impressed upon the clipper. The control circuit of the clipper 21 is coupled to a clipper level control 22 which functions in a manner to be described to set the level at which the clipper functions. Normally, this normal clipping level 23 with reference to the sawtooth wave 16 is set so that only the positive peaks, such as 24, of the sawtooth wave 16 are transferred to the output circuit of the clipper 21. These clipped sawtooth peaks, as derived from the clipper or after partial integration in a manner and for a purpose to be described, form the gate control signals 19. The normal clipping level 23 at which the clipper 21 operates may be manually controlled by an adjustment such as a potentiometer 25 connected to the clipper level control apparatus 22.

Normally, the gate threshold control 18 operates so as to effect cutoff of the gated sync amplifier 13 substantially at a level at least equal to the maximum sync signal amplitude. The gated sync signal amplifier is rendered operative momentarily, under normal conditions, in response to the gate control signals 19 which occur substantially simultaneously with the sync signals 12. Accordingly, it is seen that the sync signals then are transferred to the frequency control circuit of the sweep control oscillator substantially to the exclusion of any other interim signal effects, such as a random noise pulse 26, which has an amplitude substantially in excess of that representing picture black. By such means, spurious signals, such as the noise pulse 26, are ineffective to cause false synchronization of the deflection wave-generating apparatus.

The invention also includes apparatus by which to effect rapid initial synchronization of the deflection wave-generating apparatus and/or resynchronization thereof, should it for any reason lose synchronism. This additional apparatus includes a detector means which, in this illustrative embodiment of the invention, is designated as a coincidence detector 27. The sync signals 12 are impressed upon one input circuit of the coincidence detector and indicating pulses, such as 28 derived from the deflection wave-generating apparatus are impressed upon another input type circuit of the coincidence detector. When the sync pulses 12 and the indicating pulses 28 coincide, there is developed in the output circuit of the coincidence detector 27 a voltage representative of these conditions.

This coincidence detector-developed voltage is impressed upon the gate threshold control apparatus 18 and also upon the clipper level control apparatus 22. During synchronous operating periods of coincidence of the sync and indicating pulses, the gate threshold control apparatus is operated in a manner to condition the gated sync signal amplifier 13 for the non-conduction of signal effects including sync signals and noise pulses of comparable amplitudes. Similarly, this detector-developed voltage representative of coincidence is effective to operate the clipper level control 22 in a manner to effect operation of the clipper 21 substantially at the clipping level 23 shown with reference to the sawtooth wave 16.

Should the deflection wave-generating apparatus be operating in an asynchronous condition, there will be a lack of coincidence of the sync pulses 12 and the indicating pulses 28. This condition is effective to develop, in the output circuit of the coincidence detector 27, a representative voltage which, when impressed upon the gate threshold control 18, lowers the cutoff of the gated sync signal amplifier 13 so that it is conductive continuously for all sync signals impressed thereon and, when impressed upon the clipper level control 22, is effective to change the operation of the clipper in such a way as to establish an abnormal clipping level, such as 29, shown with reference to the sawtooth wave 16. It is seen that, as a result of this control of the clipper, there are no gated control pulses such as 19 developed and impressed upon the gated sync amplifier 13. Accordingly, the sweep control oscillator 14, which, as conventional in apparatus of this type, has a free-running frequency that is somewhat greater than that of the sync pulses 12, is subjected to the next-received sync signal 12 and is resynchronized, thereby reestablishing concidence of the sync signals and the indicating pulses 28. Consequently, as soon as coincidence again exists, the coincidence detector 27 responds thereto, thereby again setting the cutoff level of the gated sync amplifier 13 substantially at or above the maximum sync signal amplitude and again lowering the clipping level of the clipper 21 so as to cause the generation of the gate control pulses 19.

It will be made more apparent from a subsequent description of the particular apparatus used in a number of illustrative embodiments of the invention that the synchronizing system provided by the instant invention is of the relatively fast acting type, thereby minimizing the number and duration of any asynchronous periods of operation. In contrast to some of the previously used systems for providing a degree of noise immunity, the frequency control circuits of the sweep control oscillator do not require any arrangements having relatively long time constants for the purpose of obviating to a degree some of the adverse effects produced by noise pulses upon the synchronization of the oscillator. Consequently, in the present system, the sweep control oscillator may be made almost instantaneously responsive to the sync pulses as soon as its frequency closely approaches that of the synchronizing pulse repetition rate. The fast acting operation of a sync system, in accordance with the present invention, also is produced by the provision of a coincidence detector 27 which itself is inherently of the fast acting type. Hence, it will be seen that, by virtue of these features of the invention, substantially instantaneous detection of the coincidence of the sync pulses and the indicating pulses is effective to produce the described control of the gated sync signal amplifier 13 and of the clipper 21 so as to effect the desired normal control of the sweep control oscillator 14.

Figure 2:
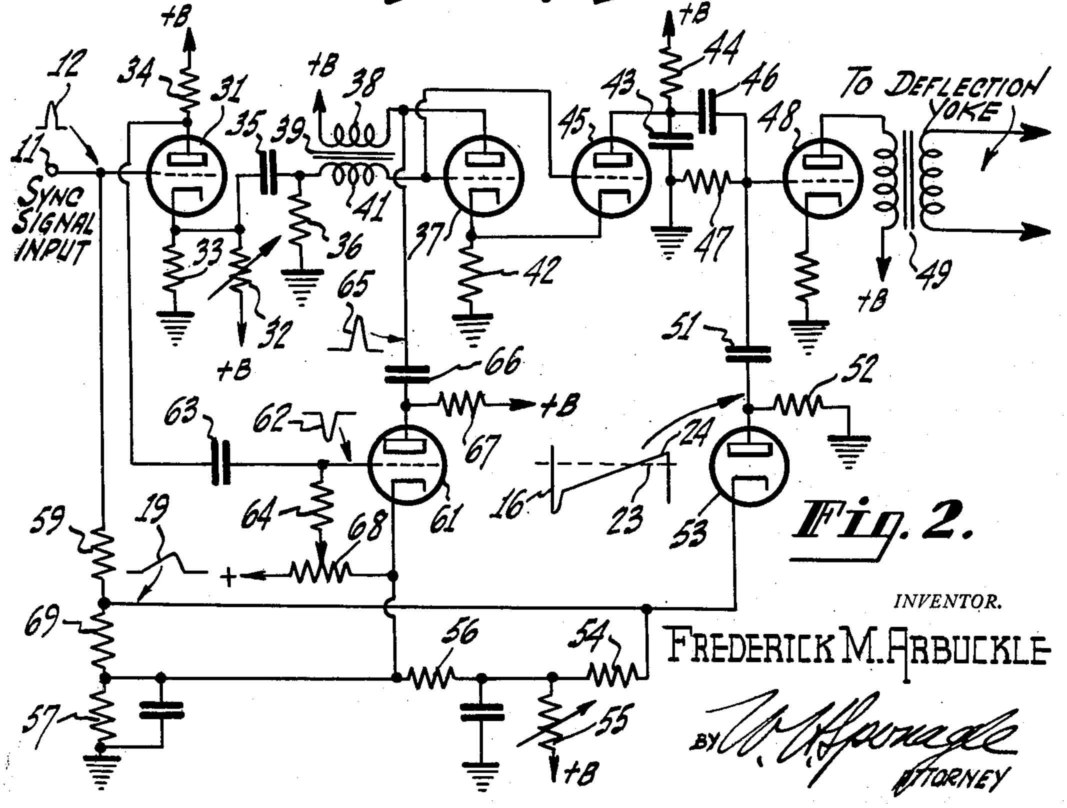
Figure 2 is a schematic circuit diagram of a particular illustrative embodiment of the invention for use in effecting synchronous operation of one sweep oscillator of a television receiver; and, Figure 3 is a schematic circuit diagram of still another embodiment of the invention as used to effect synchronous operation of both of the sweep oscillators of a television receiver.

Reference now will be made to Figure 2 of the drawings for a description of a particular illustrative embodiment of the invention for use in synchronizing electron beam deflection wave-generating apparatus substantially of the type used in a television receiver. In this form of the invention, the gated sync signal amplifier includes an electron tube 31. The control grid of this tube is coupled to the input terminal 11 for the impression thereon of the sync signals 12. The normal biasing of the gate tube 31 by which the operating threshold is established may be controlled by a variable resistor 32 which is connected as a bleeder resistor in series with a cathode resistor 33 between the positive terminal of a source of energy indicated at +B and the grounded negative terminal of such a source. Space current for the gate tube 31 also is provided from the source +B through a load resistor 34 connected to the anode of the tube. The output circuit of the gate tube 31 is derived from the cathode and is coupled by a capacitor 35 and a resistor 36 to the input, or frequency control circuit, of a sweep control oscillator.

The sweep control oscillator may be of a conventional blocking type and includes an electron tube 37 having an anode connected to the primary winding 38 of an oscillator coupling transformer 39 and a control grid coupled through the secondary winding 41 of the transformer 39 to the coupling capacitor and resistor 35 and 36, respectively. The impression of the sync pulses 12 upon the gate tube 31 in positive polarity also effects the impression of the gated sync pulses, derived from the cathode of the gate tube, in positive polarity upon the control grid of the blocking oscillator tube 37. Accordingly, in a manner well known to those skilled in the art, the operation of the blocking oscillator may be controlled synchronously by and with the sync pulses 12. The cathode of the blocking oscillator tube 37 is connected to ground through a coupling resistor 42.

The deflection wave-generating apparatus also includes a sawtooth wave generator including a capacitor 43 which is continuously charged through a resistor 44 at a relatively slow rate and which is periodically discharged by an electron tube 45 at a relatively rapid rate. The control grid of the sawtooth wave generator discharge tube 45 is connected to the control grid of the blocking oscillator tube 37 so that it is subject to control by the gated sync pulses of positive polarity derived from the gate tube 31. Also, the cathode of the sawtooth wave generator discharge tube is connected to the coupling resistor 42 so that the discharge tube may be additionally driven by the oscillator tube 37.

The output circuit of the sawtooth wave generator discharge tube 45 is derived from the anode which is coupled by a capacitor 46 and a resistor 47 to the control grid of a sweep output electron tube 48 in a conventional manner. Also, conventionally, the output circuit of the tube 48, which is derived from the anode thereof, is coupled by an output transformer 49 to a deflection yoke of a cathode ray tube.

The output circuit of the sawtooth wave generator discharge tube 45 also is coupled by a capacitor 51 and a resistor 52 to the anode of a clipper diode 53. By this means, the sawtooth wave 16 which is developed in the output circuit of the discharge tube 45 is impressed upon the clipper diode. The cathode of the diode 53 is connected by a resistor 54 to the junction point between a variable resistor 55 and a resistor 56 forming part of a bleeder network which also includes a resistor 57 and which is connected across the terminals of a suitable power supply such as indicated at +B. By this means, the diode 53 normally is biased with its cathode sufficiently positive to effect clipping of the sawtooth wave 16 approximately at the level 23. Accordingly, only the peaks 24 of the sawtooth wave 16 are transferred to the output circuit of the clipper diode which is derived from its cathode.

These transferred clipped pulses preferably, but not always necessarily, are partially integrated by the resistive-capacitive network connected to the cathode of the clipper diode 53 so as to form the gate control pulses 19. As a result of the partial integration of the clipped pulse 24, it is to be noted that the trailing edge of the pulse 19 is less steep than that of the pulse 24 from which it is derived. This shaping of the gate control pulses is effected so that the gated sync signal amplifier tube 31 will be conductively conditioned for a period extending from just prior to the time of reception of the sync signals 12 to a time sufficiently later to permit enough of the sync pulses to be transferred to the blocking oscillator tube 37 to perform their synchronizing function. This control of the gate tube 31 is effected by impressing the gate control signal pulses 19 upon the gate tube by means of a coupling including a resistor 59 connected from the cathode of the clipper diode 53 to the control grid of the gate tube 31.

As previously described, with reference to Figure 1, the invention also includes apparatus which is operative during asynchronous periods of operation to appropriately alter the described operation of the apparatus of Figure 2 so as to effect either initial synchronization or resynchronization, should the beam deflection apparatus lose synchronism for any reason. This additional apparatus, which is included in the system shown in Figure 2, comprises a coincidence detector electron tube 61. Sync pulses such as 62 of negative polarity, which may be derived from the anode of the gate tube 31, are impressed by a coupling capacitor 63 and a resistor 64 upon the control grid of the coincidence detector tube 61. Indicating pulses such as 65 of positive polarity, corresponding in time substantially to retrace intervals of the deflection apparatus and derived from the anode of the blocking oscillator tube 37, are impressed by a coupling capacitor 66 upon the anode of the coincidence detector tube 61. Space current for this tube is supplied from a suitable power supply indicated at +B through a load resistor 67 connected to the anode of the tube.

A potentiometer 68 connected from the cathode of the coincidence detector tube to a source of positive potential as indicated, and to which the grid resistor 64 is connected, provides a means for adjusting the bias of the coincidence detector tube. In this way, when the sync pulses 62 and the indicating pulses 65 coincide, the static space current of the coincidence detector tube 61, and consequently the voltage developed at the ungrounded terminal of the grid resistor 57 may be suitably adjusted so that, in conjunction with the adjustment of the potentiometer 32 associated with the gate tube 31, this tube is conditioned for the non-conduction of the sync signals 12 impressed upon its control grid. It also will be seen that the voltage developed at the ungrounded terminal of the resistor 57 influences the biasing of the clipper diode 53 so that, in conjunction with the adjustment of the potentiometer 55 the clipping level 23 is established.

Should the sync pulses 62 and the indicating pulses 65 fail to coincide, as the result of a condition where the blocking oscillator is not operating synchronously with the sync pulses 12, there will be an increase in the average space current in the coincidence detector tube 61. Consequently, the voltage which is developed at the cathode of this tube and appearing at the ungrounded terminal of the resistor 57 becomes more positive. The impression of this more positive voltage, through the grid resistors 59 and 69, upon the control grid of the gate tube 31 renders this tube continuously conducting for the sync signals 12 impressed upon its control grid. Accordingly, the blocking oscillator tube 37 has impressed upon its frequency control circuit the next synchronizing signal 12, irrespective of its phase relationship to the generated deflection wave.

At the same time, the more positive voltage developed at the cathode of the coincidence detecting tube 61 is impressed, through resistors 54 and 56, upon the cathode of the clipper diode 53, thereby raising the clipping level to a point higher than the peaks of the generated sawtooth wave 16. As previously described, this prevents the development of gate control pulses 19 which frees the gate tube 31 from this control thereby preventing false control of the oscillator tube 37 by other signals, such as video signals, having less than black level amplitudes. As soon as the blocking oscillator is resynchronized with the sync signals, there is reestablished coincidence between them and the indicating pulses so as to again reduce the average space current in the coincidence detector tube 61, whereby to restore to normal the voltage at its cathode, thereby biasing the gate tube 31 to cutoff at or above peak sync signal level and lowering the clipping level of the diode 53 so as to permit the development of the gate control pulses 19.

It is to be particularly noted that one of the features of the present invention as illustrated in Figure 2 is the relatively fast action of the coincidence detector in response to an asynchronous operating condition. This fast action is obtained largely by the arrangement whereby increased conduction in the coincidence detector tube 61 is depended upon for the development of a more positive threshold control voltage across the grid resistor 57. The system is enabled to recover much more quickly from an asynchronous state under these conditions than under the conditions where a decrease in conduction in the coincidence detector tube is depended upon for the development of the threshold control voltage. This effect is further enhanced by providing that the source of the indicating pulses 65 has a minimum impedance and also by providing a maximum practical value of the grid resistor 57.

It is to be understood that the present invention is not limited in any way with respect to the frequency of the deflection wave-generating apparatus with which it may be employed. For example, in television receiving apparatus, the invention is useful with either or both of the horizontal and vertical deflection wave-generating apparatus.

Accordingly, in Figure 3, to which reference now will be made, another illustrative embodiment of the invention is shown for use with both the horizontal and vertical deflection wave generators of a television receiver. Except for the novel synchronizing apparatus embodying the invention, the television signal-receiving and image-reproducing apparatus may be entirely conventional. Accordingly, such a receiver may be considered to include an antenna 71 to which is coupled the usual television receiver 72 which, it will be understood, comprises radio and intermediate frequency amplifiers, together with the usual frequency converter and signal detector. The detected composite television signal derived from the receiver 72 is impressed upon the input circuit of a video signal amplifier 73. As is customary in television receivers, the video amplifier output circuit is coupled to the electron gun structure 74 of a cathode ray image-reproducing device, such as a kinescope 75, for the conventional control of the electron beam intensity in accordance with the video signals. Also the output of the video signal amplifier is coupled to a sync signal separator 76 of the usual type for the separation of the horizontal and vertical synchronizing pulses from the video signal component and also from one another. Accordingly, it will be understood that separated horizontal sync pulses of positive polarity are impressed upon an output circuit conductor 77 and the separated vertical sync pulses of positive polarity upon the output circuit conductor 78 of the sync signal separator.

The general arrangement of the synchronizing apparatus embodying the present invention with the vertical deflection wave-generating apparatus is substantially of the same character as that previously described with reference to Figure 2. The separated vertical sync pulses produced in the sync signal output circuit 78 are impressed upon the control grid of the vertical gated sync signal amplifier tube 31. The output circuit of the gate tube which is derived from the cathode is coupled through the vertical blocking oscillator transformer 39 to the grids of a dual triode electron tube 82. The left hand section of this tube constitutes the blocking oscillator tube corresponding to the tube 37 of Figure 2. The right hand section of the tube 82 constitutes the discharge tube of the sawtooth wave generator and corresponds to the tube 45 of Figure 2. The sawtooth wave 16 which is developed at the anode of the right hand section of the tube 82 is impressed upon the input circuit of the sweep output tube 48. The output circuit of this tube is coupled by the output transformer 49 to the vertical coils of a deflection yoke 83 which is provided with a kinescope 75 for the purpose of deflecting the electron beam in the usual manner to scan a raster at the luminescent kinescope screen.

The vertical deflection wave synchronizing system embodying the present invention also includes a clipper which in this form of the invention may be a crystal diode 84. The crystal diode functions in the same general manner as the clipper diode 53 of Figure 2 to clip the sawtooth wave 16 at the level 23 during synchronous operating periods so as to form the gate control pulses 19 which, as indicated, are impressed upon the control grid of the gate tube 31, substantially in the same manner as in the apparatus of Figure 2. The gate tube 31 and the crystal diode 84 are biased for operation as in the case of the corresponding apparatus previously described with reference to Figure 2. The modification of the biasing of these two components, however, in response to asynchronous operating conditions, is somewhat different and will be described more fully in a subsequent portion of the specification. The operation of the vertical sync system, however, is essentially the same as that previously described.

The separated horizontal sync pulses produced in the output circuit 77 of the sync signal separator 76 are impressed upon the control grid of a horizontal gated sync signal amplifier tube 85. The horizontal sync system embodying the present invention is somewhat different from that previously described. It includes automatic frequency control apparatus of the type in which a phase comparator is employed to detect and average, on a time basis, phase differences between the received sync pulses and locally generated indicating pulses. Specifically, the automatic frequency control apparatus includes two diodes 86 and 87 connected in inverse polarity in a typical phase detector circuit to two bridge resistors 88 and 89 respectively. The horizontal sync pulses derived from the sync signal amplifier gate tube 85 are impressed by coupling capacitors 91 and 92 respectively upon the AFC diodes 86 and 87. Indicating pulses such as 93 in synchronism with the horizontal deflection wave-generating apparatus are impressed simultaneously upon both of the AFC diodes 86 and 87. In a manner which is well known to those skilled in the art of phase detectors, a control voltage is developed across an output resistor 94 which is a common return path for both legs of the AFC bridge network. This control voltage is indicative of the magnitude and sense of any phase difference between the sync pulses and the locally generated indicating pulses.

The control voltage developed across the resistor 94 is impressed by means including a resistive-capacitive coupling network 95 upon the frequency control circuit of a horizontal sweep oscillator 96. It will be understood that this oscillator also may be conventional and functions to develop a substantially sawtooth wave 97 at the horizontal deflection frequency. This wave is impressed in the usual manner upon the input circuit of a horizontal sweep output tube 98, the output circuit of which includes an output coupling transformer 99 for the impression of the sawtooth wave energy upon the horizontal coils of the deflection yoke 83. The secondary winding of the output transformer 99 is provided with an auxiliary coil 101 in which are developed the indicating pulses 93, frequently referred to as "flyback" pulses and resulting in the usual way during the retrace intervals of the horizontal scanning wave.

The horizontal synchronizing system embodying the invention also includes a clipper for the generated sawtooth wave 97. This clipper is in the form of a crystal diode 102 connected to the output circuit of the horizontal sweep oscillator 96. It is biased by means to be described subsequently so as to operate normally at a clipping level 103, whereby to transfer to its output circuit only the peaks 104 of the saw tooth wave. As in other embodiments of the invention, these peaks are partially integrated in the output circuit of the clipper crystal diode 102 to produce gate control pulses 105 at a repetition rate corresponding to the horizontal deflection frequency for impression upon the control grid of the horizontal gate tube 85.

Figure 3:
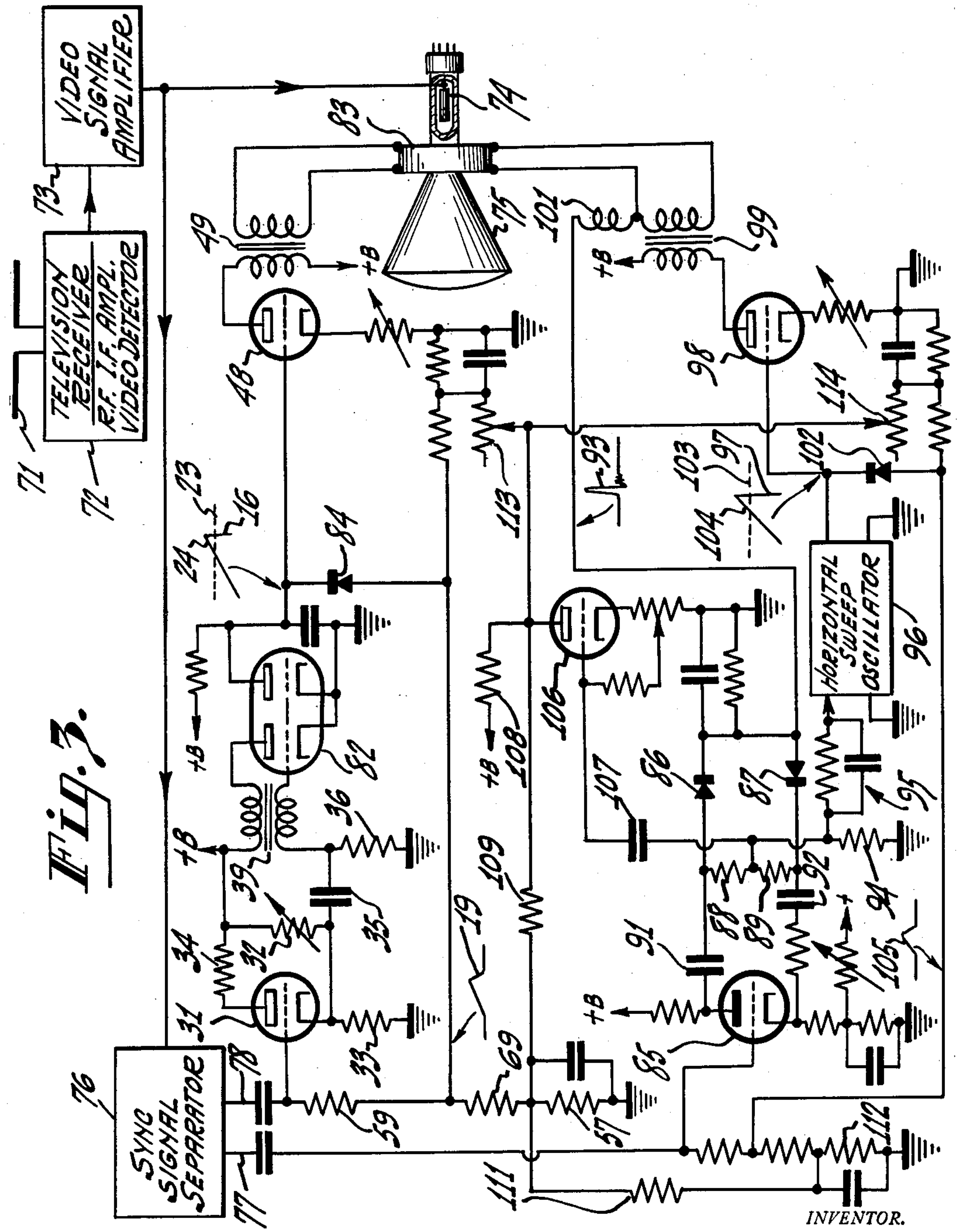

In the embodiment of the invention illustrated in Figure 3, there is provided, instead of the coincidence detector of Figures 1 and 2, a noise-immunizing circuit including an electron tube 106. The control grid of the noise-immunizing tube is coupled by means including a capacitor 107 to the ungrounded terminal of the output resistor 94 for the AFC circuit. By this means, the alternating current energy developed in the output circuit of the AFC system is impressed upon the input circuit of the tube 106. By means of such an arrangement a failure of the horizontal sync pulses to coincide with the indicating pulses such as 93 causes an increases in amplitude of the alternating current energy impressed upon the control grid of the noise-immunizing tube 106. This tube is biased sufficiently low so that the described increase in the amplitude of the alternating voltage impressed upon the control grid is sufficient to cause the conduction of grid current. As a consequence, the increased amplitude of the alternating voltage impressed upon the control grid of the tube 106 produces a decrease in the average anode current of this tube. The anode current traverses an output load resistor 108 and any decrease in the anode current effects a corresponding positive increase of the anode voltage. Thus, it is seen that, in this case, as in the case of the modification of the invention described previously with reference to Figure 2, a more positive voltage is developed at the anode of the noise-immunizing tube 106 in response to the detection of an asynchronous operating condition.

The output circuit derived from the anode of the noise-immunizing tube 106 is connected by a resistor 109 to the grid resistor 57 associated with the vertical gate tube 31 and also by a resistor 111 to a bypassed grid resistor 112 associated with the horizontal gate tube 85. Accordingly, in response to the development of a more positive voltage at the anode of the noise-immunizing tube 106, both the vertical and horizontal gate tubes 31 and 85, respectively, are conditioned for the continuous conduction of sync signals to their respective output circuits. Thus, the sync signals impressed upon the input circuits of these gate tubes are impressed upon the respective frequency control circuits of the vertical and horizontal deflection wave generators independently of any of the gate control pulses developed from the operation of the deflection wave-generating apparatus.

Also, the output circuit derived from the anode of the noise-immunizing tube 106 is connected by means including variable resistors 113 and 114 respectively to the biasing circuits of the crystal diodes 84 and 102. By this means, it will be understood that an increased positive voltage developed at the anode of the noise-immunizing tube 106 in response to an asynchronous operating condition is effective to bias the crystal diodes 84 and 102 in a manner to raise the respective clipping levels thereof to points higher than the peaks of the respective vertical and horizontal sawtooth waves 16 and 97. In this manner, the apparatus is rendered inoperative for the production of the gate control pulses 19 and 105 in much the same manner as in the apparatus described with reference to Figure 2.

It will be understood that the operation of the apparatus with both of the gated sync signal amplifier tubes 79 and 85 continuously conductive for the vertical and horizontal sync pulses, respectively, is effective to restore synchronism of the vertical and horizontal deflection wave-generating apparatus. Upon the establishment of synchronous operating conditions, a decrease is effected in the amplitude of the alternating current energy developed across the output resistor 94 of the AFC circuit. This is effective to increase the anode current in the noise-immunizing tube 106 so as to effect a decrease in the positive voltage developed at the anode of this tube. By this means, the gated sync signal amplifier tubes 31 and 85 are restored to their normal biasing for cutoff substantially at peak sync signal level and the crystal diodes 84 and 102 are again rendered operative to clip the respective sawtooth waves 16 and 97 at the levels 23 and 103 respectively, whereby to return the gate tubes 31 and 85 to the control of the respective gate pulses 19 and 105.

It may be seen from a consideration of the foregoing description of a number of illustrative embodiments of the invention that there is provided an improved synchronizing system for use with electron beam deflection apparatus generally. One of its attributes is that it is relatively immune to random noise pulses and another is that it has a comparatively short period for effecting synchronization. The invention is adaptable for use particularly in effecting substantial noise immunization in the synchronizing systems for the deflection apparatus of a television receiver. In such a case, the improved synchronizing system in accordance with the invention may be employed with either or both of the horizontal and vertical sweep control oscillators. One of the features of the improved synchronizing system in accordance with the invention is its fast acting character. It also will be seen that it provides a means for rendering the conventional automatic frequency control circuits of deflection apparatus, such as that used in television receivers, substantially immune from false operation by noise pulses. Another feature of the invention is in the provision of a sync signal amplifier which is of the gated type for use with either or both of the horizontal and vertical deflection wave-generating apparatus, whereby to render the associated synchronizing systems relatively noise-immune.

It will be appreciated that the gated sync signal amplifier forming part of the present invention operated in the manner described does not require in all cases that there be any separation of the synchronizing and video signals from the composite television signal prior to the impression of the synchronizing signals upon the gated amplifier. In such cases, it is seen that it makes possible the elimination of the customary sync signal separator, if desired.

It also will be understood that the invention is not necessarily limited to use with the illustratively disclosed types of sweep control oscillators, such as a blocking type oscillator particularly referred to. On the contrary, the invention is useful in the synchronization of any of the conventionally employed sweep control oscillators embodied in television receiver apparatus. Furthermore, it is to be understood that the particular device such as the detector tube 61 of Figure 2, which is employed to detect coincidence of the sync pulses and the locally generated indicating pulses, does not necessarily have to be a tube operated in the manner described so that a detection of non-coincidence is effective to increase the current conduction in the tube in order to make it fast acting. It will be appreciated by those skilled in the art that such a tube may be provided with circuits of a character to effect its operation as a cathode follower, in which case the cathode circuit will of necessity be of relatively low impedance and will follow in a substantially instantaneous manner variations of both increasing and decreasing magnitude in the tube current in response to the impression upon the input circuits of the tube of the sync pulses and the indicating pulses.

It also is to be understood that, while it is preferable to reshape by partial integration, for example, the clipped sawtooth peaks for the production of the gate control pulses, it is not essential that this be done in all cases. It merely is necessary that the gate tube be held open only long enough to transfer the leading edge of the received sync pulses to the frequency control circuit of the sweep control oscillator. Since the peak of the generated sawtooth wave normally occurs substantially concurrently with the reception of the leading edge of the received sync pulses, it is seen that the required conditions are satisfied. However, it generally is preferable to provide the described shaping so as to allow a slight degree of latitude.

Further with reference to the generation of the gate control pulses as described, it is preferable that the gated sync signal amplifier tube be conductively conditioned by the gate control pulses slightly in advance of the expected reception of the sync pulses. A control of the gate opening time is conveniently effected by suitably biasing the clipper to perform its clipping functions at a suitable level relative to the sawtooth wave. In general, the higher this clipping level can be set without rendering the system unstable, the shorter the interval of time during which the gate amplifier is maintained conductive and hence, the greater the noise immunity which will be produced.

The nature of the invention may be ascertained from the foregoing description of a number of illustrative embodiments thereof. Its scope is pointed out in the appended claims.

What is claimed is:

1. In a synchronizing system for electron beam deflection apparatus, a deflection wave generator including an oscillator having an output circuit and a frequency control circuit, a source of periodic synchronizing pulses, electrical signal gating apparatus having an input circuit coupled to said synchronizing pulse source, and an output circuit coupled to said frequency control circuit, said gating apparatus also having a control circuit, means normally conditioning said gating apparatus during synchronous operating periods for non-conduction of said synchronizing pulses, in such a manner that said gating apparatus may be momentarily rendered operative to effect the impression of said synchronizing pulses upon the frequency control circuit of said oscillator, and means coupled to said conditioning means and operative during asynchronous operating periods to control said conditioning means in a manner to condition said gating apparatus continuously for conduction of said synchronizing pulses.

2. In a synchronizing system for electron beam deflection apparatus, a deflection wave generator having an output circuit and including an oscillator having an output circuit and a frequency control circuit, a source of periodic synchronizing pulses, normally closed electrical signal gating apparatus having an input circuit coupled to said synchronizing pulse source, an output circuit coupled to said frequency control circuit and a control circuit, means coupled to said deflection wave generator output circuit to produce gate-operating signals at the frequency of said deflection wave, means coupling said gate-operating signal-producing means and said gating apparatus control circuit to render said gating apparatus momentarily open in response to said gate-operating signals to effect the impression of said synchronizing pulses upon the frequency control circuit of said oscillator substantially exclusively of any other signal effects which may be present with said synchronizing pulses, detector means coupled to said deflection wave generator and to said synchronizing pulse source and operative to develop control signals indicative respectively of synchronous and asynchronous operations of said oscillator, means coupling said detector means and said gating apparatus to render said gating apparatus conductive and non-conductive respectively of said synchronizing signal pulses for synchronous and asynchronous operations of said oscillator, and means coupling said detector means and said gate-operating signal-producing means to render said signal-producing means effectively inoperative for asynchronous operations of said oscillator.

3. Synchronizing apparatus as defined in claim 2 wherein, said detector means coupling to said deflection wave generator includes means producing indicating pulses at the frequency of said deflection wave, and wherein said detector means includes a device to detect coincidence or non-coincidence of said indicating pulses and said synchronizing pulses.

4. Synchronizing apparatus as defined in claim 2 wherein, said oscillator is of the blocking type producing indicating pulses at the frequency of said deflection wave, and said detector means includes a device coupled to said blocking oscillator to detect coincidence or non-coincidence of said indicating pulses and said synchronizing pulses.

5. Synchronizing apparatus as defined in claim 2 wherein, said deflection wave generator output circuit includes means producing indicating pulses at the frequency of said deflection wave, and said detector means includes a device coupled to said indicating pulse-producing means to detect coincidence or noncoincidence of said indicating pulses and said synchronizing pulses.

6. In a synchronizing system for electron beam deflection apparatus, a deflection wave generator having an output circuit and including an oscillator having an output circuit and a frequency control circuit, a source of periodic synchronizing pulses, an electrical signal gating apparatus having an input circuit coupled to said synchronizing pulse source, an output circuit and a control circuit, means coupled to said deflection wave generator output circuit to produce gate-operating signals at the frequency of said deflection wave, means coupling said gate-operating signal-producing means and said gating apparatus control circuit to render said gating apparatus momentarily operative in response to said gate-operating signals to develop in said gating apparatus output circuit said synchronizing pulses substantially exclusively of any other signal effects which may be present with said synchronizing pulses, a phase comparator having input circuits coupled respectively to said gating apparatus output circuit and to said deflection wave generator output circuit and also having an output circuit in which to produce a time-averaged frequency control signal representing phase differences between said synchronizing pulses and said generated deflection wave, and means coupling said phase comparator output circuit to said oscillator frequency control circuit to synchronize the operation of said oscillator with said synchronizing pulses.

7. In a synchronizing system for electron beam deflection apparatus, a deflection wave generator having an output circuit and including an oscillator having an output circuit and a frequency control circuit, a source of periodic synchronizing pulses, an electrical signal gating apparatus having an input circuit coupled to said synchronizing pulse source, an output circuit and a control circuit, means coupled to said deflection wave generator output circuit to produce gate-operating signals at the frequency of said deflection wave, means coupling said gate-operating signal-producing means and said gating apparatus control circuit to render said gating apparatus momentarily operative in response to said gate-operating signals to develop in said gating apparatus output circuit said synchronizing pulses substantially exclusively of any other signal effects which may be present with said synchronizing pulses, means coupled to said deflection wave output circuit to produce indicating pulses at the frequency of said deflection wave, a phase comparator having input circuits coupled respectively to said gating apparatus output circuit and to said indicating pulse-producing means and also having an output circuit in which to produce a time-averaged frequency control signal representing phase differences between said synchronizing pulses and said indicating pulses, and means coupling said phase comparator output circuit to said oscillator output circuit to said oscillator frequency control circuit to synchronize the operation of said oscillator with said synchronizing pulses.

8. In a synchronizing system for the electron beam deflection apparatus of a television receiver, respective horizontal and vertical deflection wave generators each having an output circuit and each including an oscillator having an output circuit and a frequency control circuit, respective sources of horizontal and vertical synchronizing pulses, respective horizontal and vertical electrical signal gating apparatus each having an input circuit coupled to its associated synchronizing pulse source and each having an output circuit and a control circuit, means coupled to each of said horizontal and vertical deflection wave generator output circuits to produce gate-operating signals at the respective frequencies of the generated deflection waves, means coupling said horizontal and vertical gate-operating signal-producing means respectively to said horizontal and vertical gating apparatus control circuits to render said horizontal and vertical gating apparatus momentarily operative to effect the development in their respective output circuits of said horizontal and vertical synchronizing pulses substantially exclusively of any other signal effects which may be present with said synchronizing pulses, means coupling the output circuit of said vertical gating apparatus to the frequency control circuit of said vertical deflection wave oscillator, a phase comparator having input circuits coupled respectively to said horizontal gating apparatus output circuit and to said horizontal deflection wave generator output circuit and also having an output circuit in which to produce a time-averaged frequency control signal representing phase differences between said horizontal synchronizing pulses and said generated horizontal deflection wave, means coupling said phase comparator output circuit to said horizontal oscillator frequency control circuit, means coupled to said phase comparator output circuit and operative to develop control signals indicative respectively of synchronous and asynchronous operations of said beam deflection apparatus, means coupling said indicative control signal-developing means and said horizontal and vertical gating apparatus to render said gating apparatus conductive and nonconductive respectively of said horizontal and vertical synchronizing pulses for synchronous and asynchronous operations of said deflection apparatus, and means coupling said indicative control signal-developing means and said respective horizontal and vertical gate-operating signal-producing means to render said signal-producing means effectively inoperative for asynchronous operation of said deflection apparatus.

9. In a synchronizing system for the electron beam deflection apparatus of a television receiver, respective horizontal and vertical deflection wave generators each having an output circuit and each including an oscillator having a frequency control circuit, respective sources of horizontal and vertical synchronizing pulses, means coupled to one of said deflection wave generator output circuits to produce control signals at the frequency of the generated deflection wave, and means responsive to said control signals to impress synchronizing pulses derived from one of said sources of corresponding frequency upon the oscillator frequency control circuit of the other of said deflection wave generators.

10. In a synchronizing system, an oscillator having an output circuit and a frequency control circuit, a source of periodic synchronizing pulses, electrical signal-gating apparatus having an input circuit coupled to said synchronizing pulse source and an output circuit coupled to said frequency control circuit, said gating apparatus also having a control circuit, means coupled to said oscillator output circuit to produce gate-operating signals at the operating frequency of said oscillator, means coupling said gate-operating signal-producing means and said gating apparatus control circuit to render said gating apparatus momentarily operative in response to said gate-operating signals to effect the impression of said synchronizing pulses upon the frequency control circuit of said oscillator substantially exclusively of any other signal effects which may be present with said synchronizing pulses, detector means coupled to said oscillator and to said synchronizing pulse source and operative to develop control signals indicative respectively of synchronous and asynchronous operations of said oscillator, and means coupling said detector means and said gate-operating signal-producing means to render said signal-producing means effectively inoperative for asynchronous operations of said oscillator.

11. In a synchronizing system, an oscillator having an output circuit and a frequency control circuit, a source of periodic synchronizing pulses, electrical signal-gating apparatus having an input circuit coupled to said synchronizing pulse source and an output circuit coupled to said frequency control circuit, said gating apparatus also having a control circuit, means coupled to said oscillator output circuit to produce gate-operating signals at the operating frequency of said oscillator, means coupling said gate-operating signal-producing means and said gating apparatus control circuit to render said gating apparatus momentarily operative in response to said gate-operating signals to effect the impression of said synchronizing pulses upon the frequency control circuit of said oscillator substantially exclusively of any other signal effects which may be present with said synchronizing pulses, detector means coupled to said oscillator and to said synchronizing pulse source and operative to develop control signals indicative respectively of synchronous and asynchronous operations of said oscillator, means coupling said detector means and said gating apparatus to render said gating apparatus conductive and non-conductive respectively of said synchronizing signal pulses for synchronous and asynchronous operations of said oscillator, and means coupling said detector means and said gate-operating signal-producing means to render said signal-producing means effectively inoperative for asynchronous operations of said oscillator.

12. In a television synchronizing system, a wave generator having an output circuit and a frequency control circuit, a source of signals for synchronizing said wave generator, electrical signal gating apparatus having an input circuit coupled to said synchronizing signal source and an output circuit coupled to said frequency control circuit, said gating apparatus also having a control circuit, means normally conditioning said gating apparatus during synchronous operating periods for non-conduction in such a manner that said gating apparatus may be momentarily rendered operative to effect the impression of said synchronizing signals upon the frequency control circuit of said wave generator, and means coupled to said conditioning means and operative during asynchronous operating periods to control said conditioning means in a manner to render said gating apparatus continuously operative.

13. In a television receiver, the combination including: a wave generator having a frequency and phase control circuit; a source of television signals including a synchronizing component, said synchronizing component being for the frequency and phase control of said wave generator; signal amplifying means having an input circuit coupled to said signal source and an output circuit coupled to said frequency and phase control circuit; conditioning means coupled to said control circuit and operable to establish either a first operating state of said amplifying means to effect continuous transfer of said television signals to said output circuit or a second operating state of said amplifying means to effect intermittent transfer of only said synchronizing component to said output circuit; and means including circuit components responsive to the synchronous operation of said wave generator to control said conditioning means in a manner to establish one of said operating states of said amplifying means and responsive to the asynchronous operation of said wave generator to control said conditioning means in a manner to establish the other one of said operating states of said amplifying means.

14. In a television receiver, the combination including: a wave generator having a frequency and phase control circuit; a source of television signals including a synchronizing component, said synchronizing component being for the frequency and phase control of said wave generator; signal amplifying means having an input circuit coupled to said signal source and an output circuit coupled to said frequency and phase control circuit; conditioning means coupled to said control circuit and operable to establish either a first operating state of said amplifying means to effect continuous transfer of said television signals to said output circuit or a second operating state of said amplifying means to effect intermittent transfer of only said synchronizing component to said output circuit; and means including circuit components responsive to the synchronous operation of said wave generator to control said conditioning means in a manner to establish said second operating state of said amplifying means and responsive to the asynchronous operation of said wave generator to control said conditioning means in a manner to establish said first operating state of said amplifying means.

15. In a television receiver, the combination including: a wave generator having a frequency and phase control circuit; a source of television signals including a synchronizing component, said synchronizing component being for the frequency and phase control of said wave generator; signal amplifying means having an input circuit coupled to said signal source and an output circuit coupled to said frequency and phase control circuit; conditioning means coupled to said control circuit and operable to establish either a first operating state of said amplifying means to effect continuous transfer of said television signals to said output circuit or a second operating state of said amplifying means to normally prevent transfer of said television signals to said output circuit; means coupled to said control circuit to effect intermittent transfer of only said synchronizing component to said output circuit during said second operating state of said amplifying means; means including circuit components responsive to the synchronous operation of said wave generator to control said conditioning means in a manner to establish one of said operating states of said amplifying means and responsive to the asynchronous operation of said wave generator to control said conditioning means in a manner to establish the other one of said operating states of said amplifying means; and means operative during said first operating state of said amplifying means to effectively disable said intermittent transfer effecting means.

16. In a television receiving system, the combination including: a source of a television signal having a periodically recurring synchronizing component; an oscillator having a frequency of oscillation to be controlled by said synchronizing component, said oscillator having a frequency control terminal and a signal output terminal; a frequency comparison means having two input terminals and an output terminal at which to develop a frequency control signal for application to said oscillator control terminal for controlling said oscillator frequency in accordance with the timing relation between said oscillator and said synchronizing component; an amplifier capable of being intermittently operated in a keyed mode or continuously operated in an unkeyed mode, said amplifier having an input circuit and an output circuit; means coupling said amplifier input circuit to said signal source for applying said television signal to said amplifier; means coupling the output circuit of said amplifier and the output terminal of said oscillator respectively to the input terminals of said comparison means for actuation of said comparison circuit to develop said frequency control signal; means coupling said comparison means output terminal to said oscillator frequency control terminal to impress said frequency control signal upon said oscillator frequency control terminal to control said frequency of oscillation in accordance with said synchronizing component; means including circuit components responsive to a first control signal for operating said amplifier in said keyed mode to render it intermittently operative for signal transfer from its input circuit to its output circuit during said synchronizing component periods; means including circuit components responsive to a second control signal for operating said amplifier in said unkeyed mode to render it continuously operative for signal transfer from its input circuit to its output circuit; and means for deriving said control signals from said comparison means and for impressing them upon said amplifier so as to control its mode of operation, said control signals representing the timing relationship of said oscillator and said synchronizing component.

References Cited in the file of this patent

UNITED STATES PATENTS

| | | |
|---|---|---|
| 2,141,343 | Campbell | Dec. 27, 1938 |
| 2,207,048 | Campbell | July 9, 1940 |
| 2,212,648 | Poch | Aug. 27, 1940 |
| 2,240,420 | Schnitzer | Apr. 29, 1941 |
| 2,265,290 | Knick | Dec. 9, 1941 |
| 2,277,000 | Bingley | Mar. 17, 1942 |
| 2,358,545 | Wendt | Sept. 19, 1944 |
| 2,561,817 | Parker | July 24, 1951 |
| 2,685,033 | Volz | July 27, 1954 |